Figure 1:
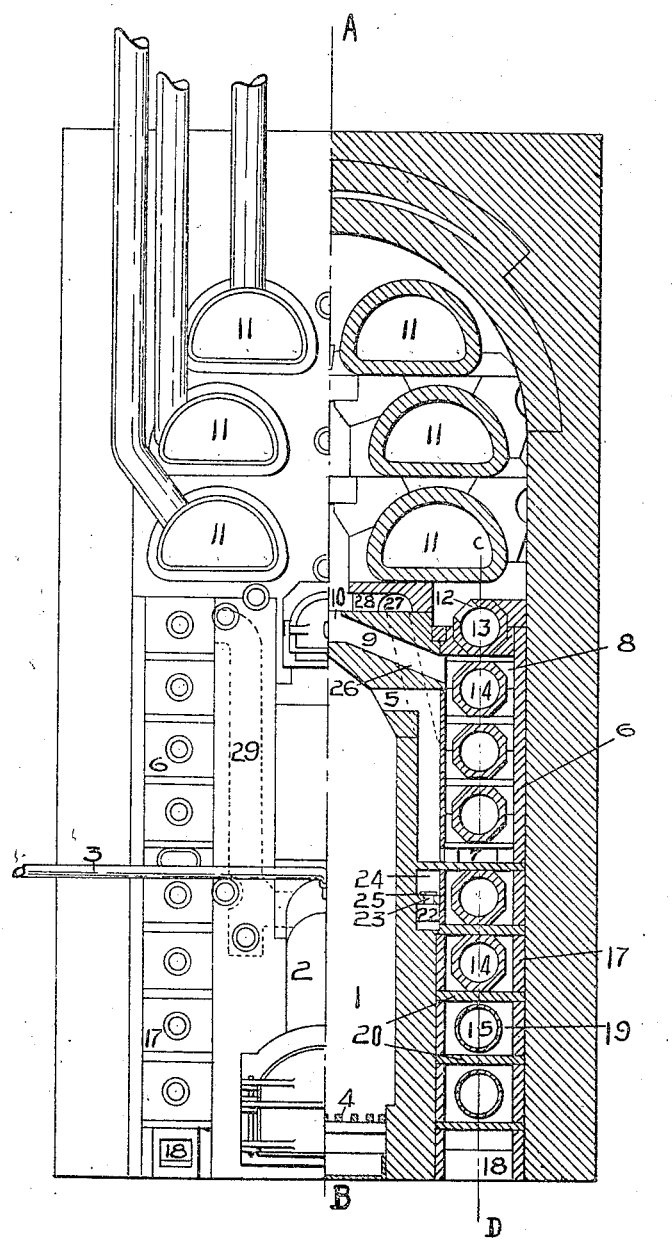

H. L. DOHERTY.
APPARATUS FOR INCREASING THE TEMPERATURE OF COMBUSTION IN GAS FIRED FURNACES.
APPLICATION FILED APR. 4, 1912.

1,117,172.

Patented Nov. 17, 1914.

3 SHEETS—SHEET 1.

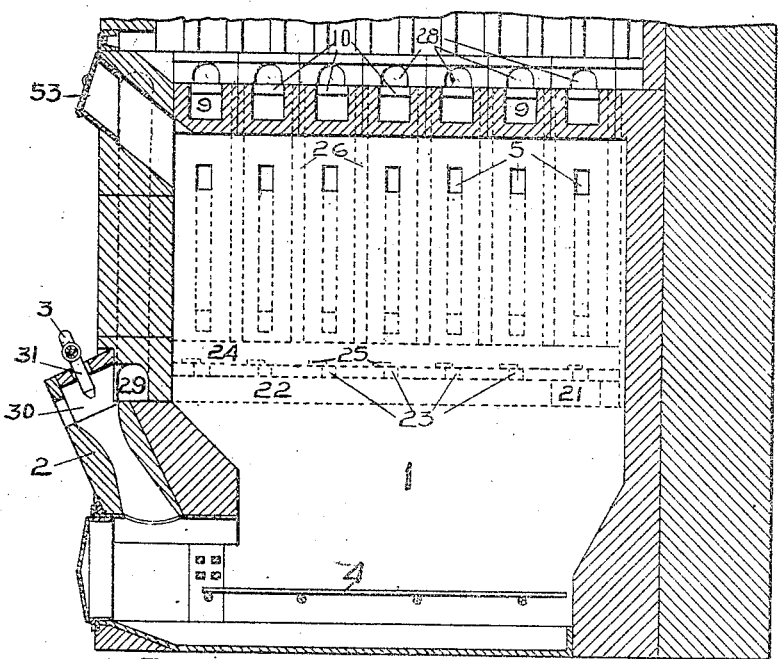
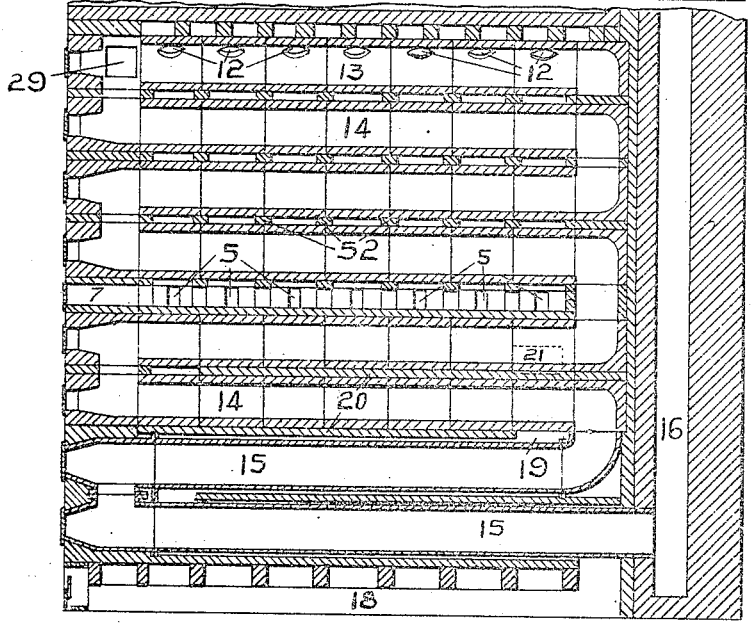

H. L. DOHERTY.
APPARATUS FOR INCREASING THE TEMPERATURE OF COMBUSTION IN GAS FIRED FURNACES.
APPLICATION FILED APR. 4, 1912.
1,117,172.
Patented Nov. 17, 1914.
3 SHEETS—SHEET 3.
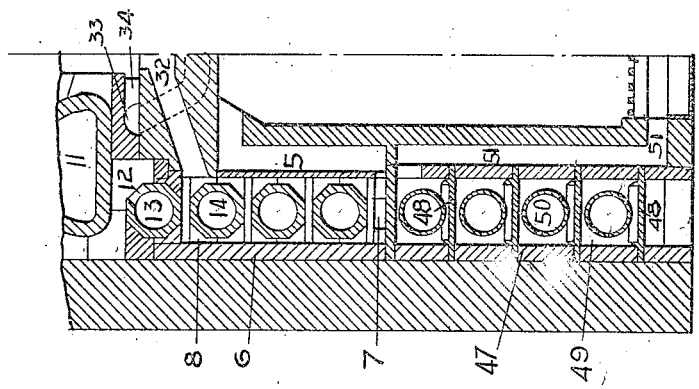
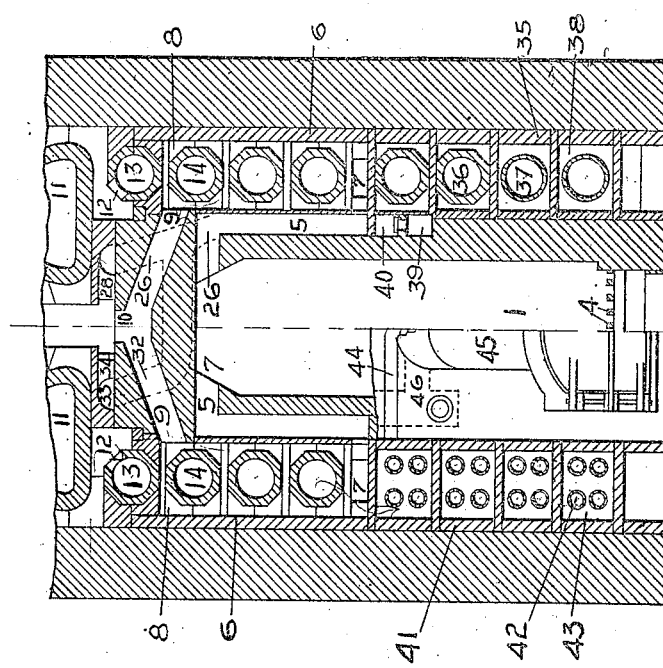

UNITED STATES PATENT OFFICE.

HENRY L. DOHERTY, OF NEW YORK, N. Y.

APPARATUS FOR INCREASING THE TEMPERATURE OF COMBUSTION IN GAS-FIRED FURNACES.

1,117,172.　　　　　Specification of Letters Patent.　　Patented Nov. 17, 1914.

Original application filed March 31, 1909, Serial No. 486,888. Divided and this application filed April 4, 1912. Serial No. 688,539.

*To all whom it may concern:*

Be it known that I, HENRY L. DOHERTY, a citizen of the United States, and a resident of New York city, in the county of New York and State of New York, have invented certain new and useful Improvements in Apparatus for Increasing the Temperature of Combustion in Gas-Fired Furnaces, of which the following is a specification.

My invention relates to apparatus for increasing the temperature of combustion in gas-fired furnaces; and it relates particularly, to that type of such apparatus in which the gas producer and gas-fired furnace are functionally connected and wherein the control and regulation of the temperature in the producer is secured by the introduction of some endothermic agent.

The objects of my invention are, the increase in efficiency of heat utilization due to the increased temperature secured in the furnace, and the increased economy in fuel due to a more perfect recuperation of the heat of the flue gases, than is secured by the various apparatus in present use.

My invention can be applied to any gas-producing-and-consuming apparatus, in which the waste gases of combustion are at a higher temperature than the producer gas leaving the gas producer.

My invention can be used equally well in connection with either the type of producer wherein the temperature control thereof is effected by the introduction of water vapor or wherein the temperature control is effected by the introduction of a regulated proportion of combustion gases into the air current supplied to the producer.

This application is a division of my application Ser. No. 486888, filed Mar. 31st, 1909, in which I claim the process involved.

The particular application of my invention which I have selected for purposes of illustration, is that of a furnace for manufacturing illuminating gas by the destructive distillation of coal. In the usual type of these furnaces, the coal is distilled or carbonized in retorts, which are heated by the combustion of producer gas, generated in a producer placed below the retort oven. The name commonly applied to this apparatus is "gas bench." These are usually built back to back, forming twin settings, a number of these being erected side by side, forming what is known as a battery, or "stack of benches." My invention, however, is not limited in its application to this particular type of apparatus. It may be applied to any combined gas-producing and gas-consuming apparatus in which the products of combustion leave the gas-consuming apparatus, or furnace, at a higher temperature than that at which the producer gas enters it, the relation of the two parts of the apparatus being such, that the products of combustion may be passed into recuperators for heating the producer gas at, substantially, the temperature at which they leave the furnace. For instance, my invention may be applied to zinc furnaces or open-hearth steel furnaces, and to many other similar types of furnaces.

In the accompanying drawings, I show more or less diagrammatically a single gas bench to illustrate the application of my invention to such apparatus. The bench shown in Figures 1, 2 and 3, is of a common type that is, at present, used in the art with the addition of my invention. In this type, the temperature regulation of the gas producer is accomplished by the use of waste gases containing reducible amounts of carbon dioxid.

My invention can be applied equally well to the ordinary type of gas bench, wherein the temperature control of the producer is effected by the introduction of water or water vapor into the fuel bed. In Figs. 4 and 5 I illustrate an application to such type of apparatus adapted to preheat the primary draft current.

In the drawings, Fig. 1 shows a single bench partly in section and partly in elevation. Fig. 2 is a longitudinal section on the line A—B of Fig. 1. Fig. 3 is a section through a recuperator on the line C—D of Fig. 1. Fig. 4 is a part cross-section of a bench of the type in which the control of the temperature of the fuel bed is secured by the use of flue gas, and the primary draft current is preheated. Fig. 5 is a partial half section of the type of bench in which water vapor is used to control the temperature of the fuel bed, and the water is evaporated by the heat of the hot combustion gases.

In the application of my invention which I herein claim, the recuperator portion of the bench is in duplicate, the construction being similar on either side of a longitudinal plane through the middle of the producer, save that the entrance and take-off flues are, in each case, on the side of the recuperators next to the producer.

In the drawings, 1 is the gas producer, 2 is the injector by means of which a mixture of air and flue gas is introduced into the producer.

3 is a pipe through which air under pressure is supplied to the injector; 4 is the grate of the producer; 5 are flues conveying producer gas to the producer gas recuperators 6; 7 are equalizing flues; 8 the producer gas flue through the recuperator.

9 and 10 are passages for conducting the producer gas from the producer gas recuperators to the retort oven.

11 are the retorts containing the coal to be carbonized.

12 is a series of ports or orifices in a flue 13, (one for each recuperator) through which the waste gases of combustion pass to the recuperator.

14 and 15 are flues affording passage for the waste gases through the recuperator to the flue 16 leading to the stack. 17 the air recuperators, having air-inlet flues 18, and series of return-bend flues 19. 20 horizontal partitions dividing the air recuperators into a series of return-bend flues.

21 are ports, one for each recuperator, providing entrance for air into the equalizing flues 22.

23 are ports connecting flues 22 with parallel flues 24.

25 are movable tiles which can be used to regulate the area of the openings in the port 23, so as to secure a uniform flow of air from 22 to 24 along the entire length of the flues.

26 are two series of flues (one series for each side of the recuperator) connecting 24 with another parallel flue 27, from which the air discharges through the ports or nostrils 28 into the stream of producer gas entering the retort oven through the port 10.

29 are flues, one for each side of the bench, conducting part of the waste gases, after their passage through the retort oven, to the induction chamber 30 of the inductor 2.

31 is the nozzle of the inductor.

52 are vertical partitions in recuperators 6; 53 is a chute through which the fuel is charged into the producer 1.

In Figs. 4 and 5 like numerals indicate like parts in Figs. 1, 2 and 3.

In Fig. 4, 32 are branches of flues 26, carrying a portion of the secondary air rising through 26 to the left-hand side of the bench and discharging it into the equalizing flue 33, from which it discharges through the nostrils 34. 35 is the secondary air recuperator having waste gas flues 36 and 37 and air flues 38. 39 is an equalizing flue receiving the heated air from 25, and distributing it to the flue 40, from where it passes into the flues 26. 41 designates the primary air recuperator having air passages 42 and waste gas flues 43. 44 is a pipe taking off the air from 41 and conveying it to the injector 45. 46 are flues, one on each side of the bench, conveying part of the combustion gas to the injector 45.

In Fig. 5, 47 is the primary air recuperator having water-pans 48, air flues 49, and combustion gas flues 50. 51 are flues conducting the heated primary air current to the producer. The construction of the producer gas recuperators is the same as shown in Fig. 4.

In the form which I herein specifically claim, the method of operating is as follows: The bench being in operation, the main portion of the waste combustion gases is taken off from the retort oven through the ports 12 into the flues 13, from which the gases pass into the flues 14, back and forth through 14 and 15 in a serpentine course through the recuperators 6 and 17, and thence to the stack through the flues 16. The air for the primary combustion in the producer, is brought under pressure to the injector 2, through the pipe 3. For compressing the air any satisfactory type of positive blower may be used. The air discharges into the inductor or injector 2 through the nozzle 31, creating a reduced pressure in the chamber 30. This, in turn, induces a flow of waste combustion gases through the flue 29 from the retort oven, the current of combustible gases mingling with the air discharged through the nozzle 31, the mixture forced under the grate of the producer, and thence passes up into the fuel bed. Here, in the manner described in my Letters Patent No. 829105, dated Aug. 21st, 1906, the free oxygen of the air and one-half of the combined oxygen of the carbon-dioxid of the flue gases, combines with the carbon of the incandescent bed of fuel in the producer, to form the combustible gas, carbon monoxid, which constitutes the chief combustible ingredient of my producer-gas.

Although the product of the reaction in each case is the same, viz., carbon monoxid, by burning part of the fuel by the available O of the $CO_2$, I secure certain very important results.

By the reaction between the oxygen of the air and the carbon of the fuel, viz., $C_2 + O_2 = 2CO$, a very large amount of heat— about 4450 B. T. U. per pound of carbon so consumed—is liberated. This, if no provision is made for absorbing and removing it from the fuel bed, would raise the latter to a very high temperature, more or less completely fluxing the ash, with the result that the latter would form large aggregations in the fuel bed, known as clinkers. This action would, in time, almost completely prevent the passage of the gaseous current into the producer. By the second reaction, however, which I make use of in my producer, this excess heat is absorbed and made latent in the shape of carbon-monoxid. This second reaction is $2CO_2 + C_2 = 1CO$. In this reaction, for every pound of the carbon of the fuel so consumed, about 13,000 B. T. U. are absorbed and rendered latent. It is apparent that by properly regulating the proportion of combustion gases to air, I may maintain any desired temperature in my producer.

The producer gas rising from the fuel bed of the producer is taken off from the producer through the flues 5 and passes therethrough to the equalizing flues 7 of the recuperators 6. These flues 7 are simply open passages running the length of the recuperators 6, and serving to distribute the producer gas uniformly throughout the length of the recuperators. These producer-gas recuperators have vertical partitions 52, which serve to support the flues 14, and, in effect, divide the main producer-gas flues into groups of sub-flues. The producer-gas rising through the flues 8, passes around the horizontal flues 14, receiving heat from the same and having its temperature correspondingly increased.

The heater producer gas leaves the recuperator through the flues 9, the currents from the corresponding flues, 9, on either side of the bench joining and passing through a port 10, into the combustion chamber of the retort oven. Here the producer gas meets the secondary air and burns.

The secondary air enters the recuperators, 17, through the air inlet flues 18, thence passes through the series of return-bend flues, 19, back and forth through the recuperators in a direction contrary to the flow of combustion gases through the smaller return-bend flues, 15, and 14. The lower flues, 15, are of metal of relatively high conductivity while the upper flues, 14, are of material such as fire clay, possessing a high degree of refractoriness. The use of material of relatively high conductivity for the lower flues of the recuperator enables me to secure practically as high a temperature in my secondary air as I could secure in my older type of recuperator such as shown in Letters Patent 829105, dated Aug. 21st, 1906, above referred to, although in my present invention I am entering the flue gases into the secondary air recuperator at a somewhat lower temperature.

The highly heated secondary air leaves the uppermost flue, 19, through the port, 21, and passes into the equalizing flue, 22. Along this flue, as shown, are small orifices or ports, 23, having movable tiles, 25, which may be adjusted by means of a metal rod or hoe worked through a suitable handhole at the end of the flue, so as to regulate the free area of the ports, 23. By this means I am able to secure a practically uniform flow of the secondary air into the flue, 24, along its whole length. From 24 the secondary air passes upward through the flues, 26, into a flue, 27. From 27 the air is distributed to the nostrils, 28, from which it discharges into the combustion chamber of the retort oven, burning the producer gas entering through 10. The products of this combustion pass up and around the retorts, imparting to the latter part of their sensible heat, thence to the upper flues, 13, of the recuperators from which, part of the gases pass through the flues 14 and 15 to the stack and part to the injector. The part going to the injector is passed into the fuel bed in the manner already explained. The main current of combustion gases passes from the discharge flues of the recuperators through the flues, 16, to the stack, whence the gases discharge into the atmosphere.

In the operation of a bench such as is shown in my co-pending application Ser. No. 421502 filed May 23rd., 1911, with my present invention applied thereto (see Fig. 4), the principal difference from the method of operation described above is that the primary air is led through a recuperator, for preheating by the sensible heat of the combustion gases, before discharging into the injector. In this type of bench, as shown, the primary air recuperator is located in one side of the producer and the secondary air recuperator on the other side. The secondary air recuperator is very similar to the one hereinbefore described, except that passages, 32, are provided for supplying the air nostrils, 34, on the left-hand side of the bench with half of the secondary air heated in the recuperator, 35. The primary air recuperator, 41, consists of a series of return-bend flues, 43, having smaller flues, 42, located within them. The uppermost flue, 43, receives the current of flue gas that has passed through the left-hand producer gas recuperator, 6, the gas passing through the flues, 43, in series, and discharging into a flue leading to the stack. The flues, 42, are simply metal pipes entering headers in the front and back of the recuperator, the adjacent sections of the headers being, alternately, separated and in communication so as to form a return-bend flue. The heated primary air discharges from the recuperator, 41, through the pipe, 44, leading to the nozzle of the inductor, 45. The action of the inductor draws in a portion of the waste combustion gases through the flues, 46, and forces the resultant mixture of air and combustion gases into the fuel bed of the producer. Here, the reactions which take place are the ones already described.

It will be seen that the principal difference in the last described apparatus is in the provision for heating the primary air supplied to the producer, by means of some of the sensible heat of the flue gases. By this combination, I am able to secure the highest practicable recuperation of heat from the waste gases. In the application of my present invention to a gas bench of the type described in my application Ser. No. 421503 filed May 23rd, 1911 (shown in Fig. 5) the operation, as concerns my present invention, in no way differs from the description given above. The difference in the operation of the bench relates, exclusively, to the producer.

In this apparatus, the air for primary combustion in the producer is drawn into the primary recuperator, 47, by the draft of the stack and passes up through the return-bend flues, 49, over the water-pans, 48. The hot flue gases leaving the producer gas recuperator on the left-hand side of the bench, pass through the flues, 50, of the primary air recuperator, parting with most of their sensible heat to the primary current, and thence go to the stack.

The primary current which is a mixture of air and water vapor, becomes highly superheated in the upper flues of 47, and passes through the flues, 51 to the ash pit of the producer. From here it passes into the fuel bed. In this case the reactions in the producer are, (1) $C_2 + O_2 = 2CO$,
(2) $C_2 + 2H_2O = 2CO + 2H_2$.

As fully explained in my application Ser. No. 421503, filed May 23rd, 1911 these reactions are thermally opposed—(1) being a heat generating, or exothermic reaction, while (2) is a heat absorbing, or endothermic reaction.

By regulating the relative proportions of water vapor and air, it is apparent that I can hold the temperature of the producer at any point desired.

In this specification the terms, waste combustion gases, waste products of combustion and flue gas are used interchangeably; also the term injector and inductor, the apparatus referred to being an inductor in relation to the flue, 29, and an injector in its relation to the producer.

It is to be understood that I do not limit myself to the exact construction of apparatus shown in the accompanying drawings. It is clear, for instance, that the number of flues in the respective recuperators may be varied to suit the requirements of any particular installation.

In the particular application of my invention which I have selected for purposes of illustration, viz., that to a furnace for heating retorts for the manufacture of illuminating gas by the destructive distillation of coal or other bituminous substances, the heat which does useful work is, only, that portion of the total heat developed in the furnace which is absorbed by the coal or other bituminous matter in the retorts. To effect this destructive distillation of coal in a manner which is commercially profitable, it is necessary to keep the retorts at a comparatively high temperature, say at least 2000° F. Although in practice the temperature at the exterior of the retorts is more usually nearer 2300° F. It is easily seen that this temperature of the retorts fixes the temperature at which the waste gases must be allowed to leave the furnace, since any further cooling of them would involve a corresponding drop in the temperature of the retorts with which they were latest in contact. For this reason, it is not possible to increase the economy of heat utilization of the furnace by reducing the temperature at which the products of combustion are discharged. On the other hand, any increase in the maximum temperature of the combustion gases in the combustion chamber of the furnace, increases, correspondingly, the amount of heat that may be utilized in the retorts. This is due to the fact that the amount of heat transmitted by conduction from one fluid to another through a partition separating the two fluids is directly proportional to the temperature difference between the two. For example, if, in the customary method of operating a bench, the retorts are kept at a temperature of 2000° F., while the highest temperature of the combustion gases is 2500° F., and the temperature at which they make their exit from the furnace is 2000° F., we would get a certain amount of heat transmitted from the combustion gases through the walls of the retort, to the gases or other material therein. Now if, through preheating the producer gas and the air supplied to the combustion chamber, we are enabled to raise the temperature of the combustion gases to, say 2700° F., we would, theoretically, multiply the amount of heat transmitted by conduction by the ratio of the corresponding difference in temperature between the combustion chamber and the retorts. That is, assuming that the same weights of producer gas and air are supplied in the two cases, with the higher temperature in the retort-oven, we would increase the quantity of heat passing into the retorts in the ratio 700/500, or an increase of forty per cent. over the quantity of heat passing into the retorts at the lower temperature.

In addition to the heat transmitted by conduction we have to consider that transmitted by radiation. According to a well known law the radiation from a body increases as the fourth power of the absolute temperature. By raising the flame temperature, therefore, from 2500° to 2700° F., (=from 2959° absolute to 3159° absolute) we would increase the radiation at 2500° in the ratio $$\frac{3159(4)}{2959(4)} = 1.3 \text{ (about)}.$$

It should be noted, in this connection, that the average temperature of the mass of coal or other material in the retorts, is much lower than the temperature of the retorts themselves. Any increase in the heat passing into the retort goes to hasten the process of distillation, or carbonization as it is usually termed, and not, to any great extent, to raising the temperature of the coal. This is true as long as the coal is uncarbonized; and, since it is the aim to remove from the retorts the residual coke as soon as most of the volatile matter of the coal has been driven off, the above statement is, substantially, true in the practical operation of gas benches.

It follows, from the above, that any increase one can make in the temperature of the combustion chamber, will, correspondingly, increase the capacity of the bench. Since, in my present invention, the heat that is used in the preheating of the air and producer gas is recuperated from the sensible heat of the waste flue gases, the increased utilization of heat that I get in my retort oven is clear gain. I am, simply, taking heat from the, otherwise, wasted heat of the flue gases and adding it to the heat utilized, using the producer gas and the air for combustion as the medium of transference. By my invention, I am, therefore, able to carbonize a considerably greater weight of coal for the same expenditure of fuel in the producer.

As stated above, this invention is not limited in its application to the particular type of gas bench which I have shown as the preferred subject of its application.

The method of operating the gas producer of the combined gas producer and gas-fired furnace—in his case a gas bench—with my present invention applied thereto, is not, essentially, different from that described in my Letters Patent No. 829105, dated Aug. 21st., 1906 when the application of the invention is to the type of combined gas producer and furnace therein described. The principal difference is that the flue gases leaving the retort oven are first passed through recuperators for heating the producer gas. They then pass into the recuperators for heating the secondary air. During their passage through the producer gas recuperators the flue gases, of course, fall in temperature by an amount corresponding to the quantity of heat which they give up to the producer gas. They, therefore, do not enter the air recuperators at so high a temperature as in the type of bench described in my Letters Patent No. 829105 dated Aug. 21st., 1906. In this present type of bench, therefore, in order to secure the same degree of preheating of the air, I cause the air current, instead of flowing in a direct vertical direction through the recuperators, to flow back and forth in the recuperator in a direction contrary to the direction of flow of the flue gases passing through the smaller flues located within the air flues. Likewise, as described and claimed in the same application, I make the lower flues of the recuperator of metal of a relatively high heat conductivity. In thus causing the air to traverse a comparatively long path through a flue of relatively small cross-section, I gain an important increase in the efficiency of heat transference from the flue gases to the air. The transmission of heat from one fluid to another through a separating diaphragm depends, not only on the difference in the temperature between the two fluids, and the time during which they are in contact with the heat-transmitting diaphragm, but, also, upon what is of equal importance, the velocities of the two fluids along the surfaces of the transmitting diaphragms. The quantity of heat taken up from or given out to a heat-transmitting surface by a fluid is proportional to the square root of the velocity of flow of the fluid along the surface. This factor is of even greater importance when the heat-transmitting diaphragm is—as in part of the recuperator we are now considering—of a rough porous surface. The combination of this type of recuperator with the recuperator for heating the producer is, therefore, a point of great importance, and it is in this combination which gives my invention, as a whole, great practical utility.

This invention is particularly applicable to producers in which bituminous coal, lignite, or any other fuel containing a large amount of volatile matter is used in the producer. In this case, the rapid evolution of volatile matter immediately after charging greatly reduces the temperature of the gas leading the producer. This, in turn, results in a lower temperature in the retort oven, or furnace, and in consequence subjects the retorts with their contents to a decided chilling effect. By my invention this irregularity of operation is entirely avoided.

Having described my invention, what I claim is:—

1. In combination, a gas-fired furnace, a heat recuperator for heating combustible gas supplied to said furnace, a heat recuperator for heating air supplied to said furnace, and conduits for conducting through said recuperators arranged in series, the hot combustion gases from said furnace.

2. In combination, a gas-fired furnace, a heat recuperator for heating combustible gas supplied to said furnace, a heat recuperator for heating air supplied to said furnace, and means for conducting hot combustion gases from said furnace first through the heat recuperator for producer gas and then through the heat recuperator for air.

3. In combination, a furnace for generating combustible gas, and a furnace for burning combustible gas, two recuperators for heating said combustible gas and two recuperators for heating air for supporting the combustion of said combustible gas, one of said recuperators for heating combustible gas and one of said recuperators for heating air being located on one side of said furnace for generating combustible gas, and the other of said recuperators on the other side of said furnace for generating combustible gas, the two recuperators on each side of said furnace being in superimposed relationship.

4. In combination, a furnace for generating combustible gas and a furnace for burning combustible gas, two recuperators for heating said combustible gas, and two recuperators for heating air for supporting the combustion of said combustible gas, one of each of said gas-heating and said air-heating recuperators being located on one side of said furnace for generating combustible gas and the other of said gas-heating and said air-heating recuperators being located on the other side of said furnace, the said gas-heating recuperators being located above said air-heating recuperators.

5. In combination, a furnace for generating combustible gas, and a furnace for burning combustible gas, two recuperators for heating said combustible gas and two recuperators for heating air for supporting the combustion of said combustible gas, one of said gas-heating recuperators and one of said air-heating recuperators being located on one side of said furnace and the other of each of said recuperators on the other side of said furnace for generating combustible gas, and conduits for conducting hot combustion gases from said furnace for burning combustible first through said gas-heating recuperators and then through said air-heating recuperators to heat the said combustible gas and to heat air.

6. In combination, a heat recuperator for heating combustible gas, and a heat recuperator for heating air, the said gas-heating recuperator being located above said air-heating recuperator, the said recuperators each comprising a return-bend flue for conducting heating gases and flues for conducting, respectively, gas and air, and a passage connecting the return-bend flues of the two recuperators.

7. In combination, a heat recuperator for heating combustible gas and a heat recuperator for heating air, the said gas-heating recuperator being located above said air-heating recuperator, the said gas-heating recuperator comprising a return-bend flue for conducting heating gases and a flue transverse to said flue for heating gases for conducting combustible gas, said air-heating recuperator comprising a return-bend flue for conducting heating gases and a return-bend flue for conducting air, the said air flue enveloping said flue for heating gases, and a passage connecting the heating-gas flues of the said recuperators, whereby the said heating gases are conducted first through said gas-heating recuperator and then through said air-heating recuperator.

8. In combination, a gas-producing furnace and a gas-consuming furnace, two recuperators for heating combustible gas produced in said gas-producing furnace, one of said recuperators being located on each side of said gas-producing furnace, two recuperators for heating air for burning said combustible gas, one of said air-heating recuperators likewise being located on each side of said gas-producing furnace, and vertically beneath the corresponding gas-heating recuperators, said gas-heating recuperators each comprising a flue for conducting hot combustion gases formed by the burning of said combustible gas and a flue in heat transferring relationship with said combustion-gas flue for conducting said combustible gas, said air-heating recuperators likewise each comprising a flue for conducting hot combustion gases and a flue in heat transferring relationship with said combustible gas flue for conducting air, a passage connecting the combustion gas flue of each gas-heating recuperator with the combustion gas flue of the corresponding air-heating recuperator, a conduit for conducting combustible gas from said gas-producing furnace to each of said gas-heating recuperators, and a conduit for conducting the heated combustible gas from each of said gas-heating recuperators to said gas-consuming furnace, and a conduit for conducting heated air from said air-heating recuperator to said gas-consuming furnace.

9. In combination, a gas-producing furnace and a gas-consuming furnace, two recuperators for heating combustible gas produced in said gas-producing furnace, one of said recuperators being located on each side of said gas-producing furnace, two recuperators for heating air for burning said combustible gas, one of said air-heating recuperators being located on each side of said gas producing furnaces and vertically beneath the corresponding gas-heating recuperators, said gas-heating recuperators each comprising a flue for conducting hot combustion gases formed by the burning of said combustible gas and a flue in heat-transferring relationship with said combustion gas flue for conducting said combustible gas, said air-heating recuperators likewise each comprising a flue for conducting hot combustion gases and a flue in heat-transferring relationship with said hot combustion gas flue for conducting air, a conduit for connecting the combustion gas flue of each gas-heating recuperator with the combustion gas flue of the corresponding air-heating recuperator, a plurality of conduits for conducting combustible gas from said gas-producing furnace to each of said gas-heating recuperators, and a plurality of conduits for conducting heated air from said air-heating recuperator to said gas-consuming furnace.

10. The structure comprising in combination, a gas-producing furnace for producing combustible gas, side closures and a top closure for said gas-producing furnace, a gas-consuming furnace located above the top-closure of said gas-producing furnace, a recuperator for heating combustible gas and a recuperator for heating air located on each side of said gas-producing furnace without the side closures of the same, said air-heating recuperators being located beneath the corresponding gas-heating recuperators, each of said recuperators for heating gas comprising a conduit for conducting hot combustion gases from said gas-consuming furnace and a conduit for conducting combustible gas, said conduits being in heat-transferring relationship, said air-heating recuperators each comprising a conduit for conducting combustion gases and a conduit for conducting air, said conduits being in heat-transferring relationship, a conduit connecting the inlet end of the combustion gas conduit of each gas-heating recuperator with said gas-consuming furnace, and a conduit connecting the outlet end of the combustion gas conduit of each gas-heating recuperator with the inlet end of the combustion gas conduit of the corresponding air-heating recuperator, a plurality of conduits in each of the side closures of said gas-producing furnace for conducting combustible gas from said gas-producing furnace to the lower part of the combustible-gas conduit of the corresponding gas-heating recuperator, and a plurality of conduits located in the top-closure of said gas-producing furnace for conducting heated combustible gas from the upper portion of the combustible-gas conduit of each of said gas-heating recuperators to the combustion chamber of said gas-consuming furnace, and a plurality of conduits for conducting heated air from the upper part of the air conduit of each of said air-heating recuperators to the combustion chamber of said gas-consuming furnace.

11. The structure comprising in combination, a gas-producing furnace for producing combustible gas, side closures and a top closure for said gas-producing furnace, a gas-consuming furnace located above the top-closure of said gas-producing furnace, a recuperator for heating combustible gas and a recuperator for heating air located on each side of said gas-producing furnace without the side-closure of the same, said air-heating recuperators being located beneath the corresponding gas-heating recuperators, each of said recuperators for heating gas comprising a conduit for conducting hot combustion gases from said gas-consuming furnace, and a conduit for conducting combustible gas, said conduits being in heat-transferring relationship, said air-heating recuperators each comprising a conduit for conducting combustion gases and a conduit for conducting air, said conduits being in heat-transferring relationship, a conduit connecting the inlet end of the combustion gas conduit of each gas-heating recuperator with the said gas-consuming furnace, and a conduit connecting the outlet end of the combustion gas conduit of each gas-heating recuperator with the inlet end of the combustion gas conduit of the corresponding air-heating recuperator, a plurality of conduits in each of the said side-closures of said gas-producing furnace for conducting combustible gas from said gas-producing furnace to one extremity of the combustible-gas conduit of the corresponding gas-heating recuperator, and a plurality of conduits located in the top-closure of said gas-producing furnace for conducting heated combustible gas from the upper portion of the combustible gas conduit of each of said gas-heating recuperators to the combustion chamber of said gas-consuming furnace, and a plurality of conduits for conducting heated air from the upper part of the air conduit of each of said air-heating recuperators to the combustion chamber of said gas-consuming furnace, said air-conducting conduits extending through the corresponding side-closures of said gas-producing furnace and through the top-closure of the same, the air-conducting conduits coöperating with each of said air-heating recuperators being alternated in position with the combustible-gas-conducting conduits of the corresponding gas-heating recuperators, whereby the combustible gas and air are introduced into said gas-consuming furnace in a plurality of streams, the said combustible gas streams alternating with said air streams.

12. The structure comprising in combination, a gas-producing furnace, side-closures for said furnace and a top-closure for said furnace, a gas-consuming furnace, an equalizing flue for air located in each of said side-closures, a passage connecting each of said equalizing flues with a source of heated air, a distributing flue for air located above and substantially parallel to each of said equalizing flues, a plurality of dampered passages connecting each equalizing flue with its coöperating distributing flue, a plurality of conduits in each of the side-closures of said gas-producing furnace for conducting combustible gas from said furnace to a gas-heating means, a plurality of conduits in the top-closure of said gas-producing furnace for conducting hot combustible gas from a gas-heating means to the combustion chamber of said gas-consuming furnace, a plurality of conduits connecting said air distributing-flue with said combustion chamber, said air conduits extending through the side-closures and the top-closure of said gas-producing furnace, and being alternated in position with said gas-conducting conduits, whereby heated combustible gas and heated air are introduced into the combustion chamber of said gas-consuming furnace in a plurality of streams, each of said gas streams being alternated in position with one of said gas streams.

Signed at New York city, in the county of New York and State of New York, this 3rd day of April A. D. 1912.

HENRY L. DOHERTY.

Witnesses:
　THOS. I. CARTER,
　LOUIS ANTONSANTI.